April 11, 1967 F. J. TREMENTOZZI 3,313,140
AUTOMATIC CALIBRATION OF DIRECT CURRENT
OPERATED MEASURING INSTRUMENTS
Filed Dec. 31, 1964 2 Sheets-Sheet 1
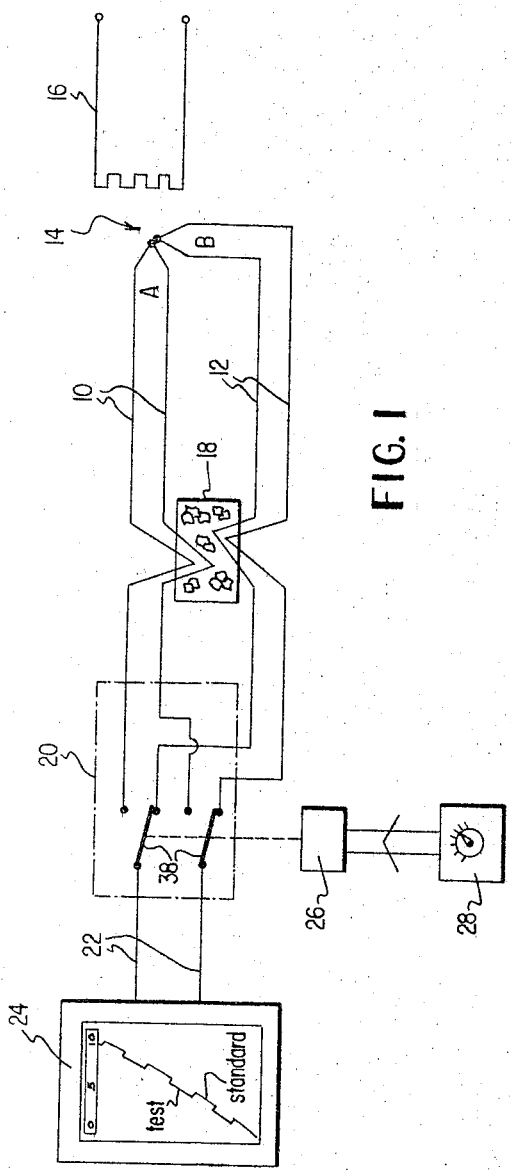
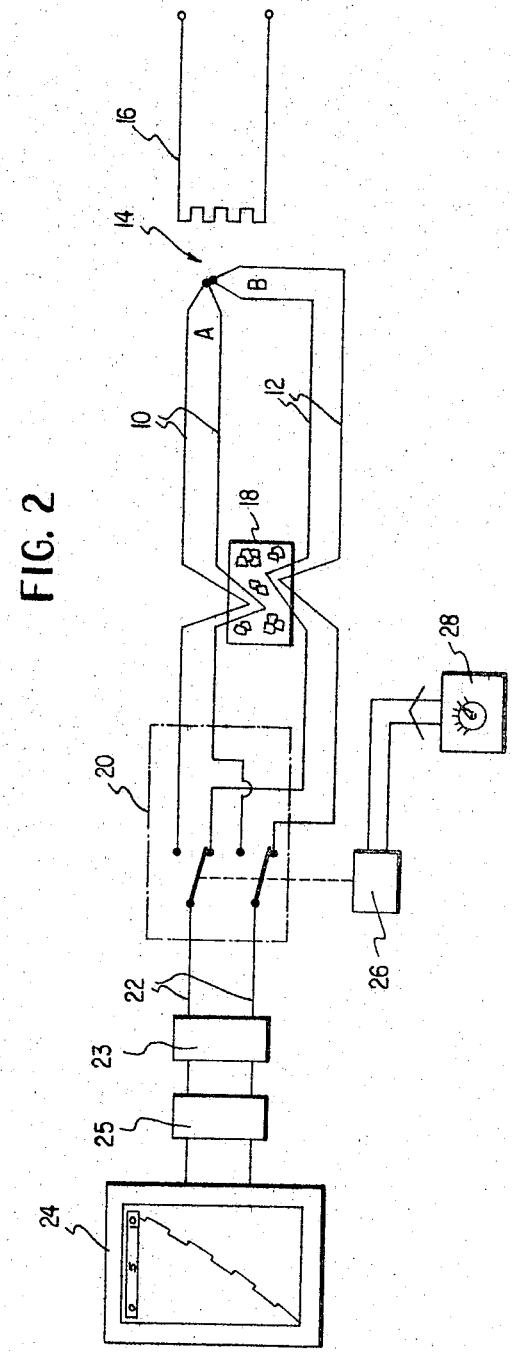
INVENTOR.
FREDERICK J. TREMENTOZZI
BY *Sughrue, Rothwell, Mion, Zinn & Macpeak*
ATTORNEYS.

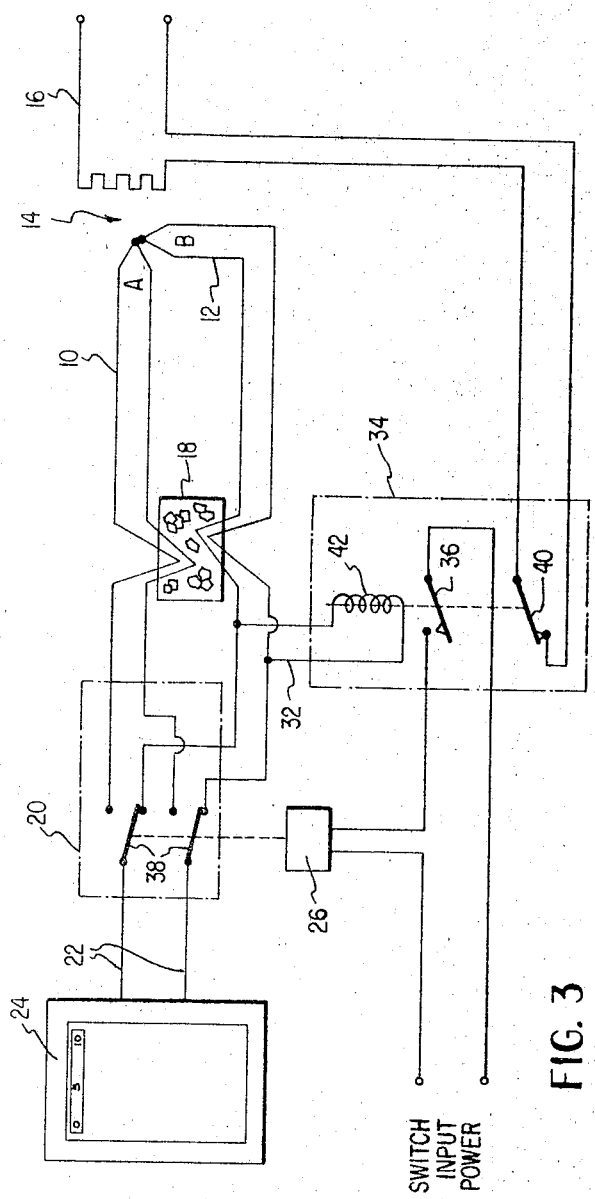
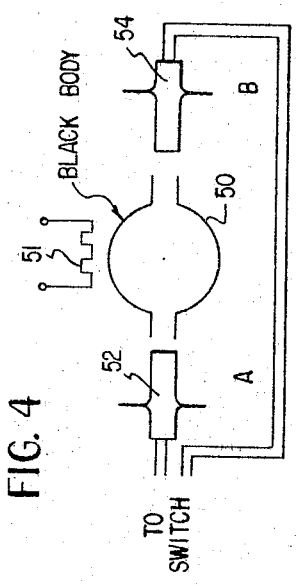
FIG. 3
FIG. 4
FIG. 5
INVENTOR.
FREDERICK J. TREMENTOZZI
BY
ATTORNEYS.

ial current generated. The
United States Patent Office 3,313,140
Patented Apr. 11, 1967

3,313,140
AUTOMATIC CALIBRATION OF DIRECT CURRENT OPERATED MEASURING INSTRUMENTS
Frederick J. Trementozzi, Corning, N.Y., assignor to Corning Glass Works, Corning, N.Y., a corporation of New York
Filed Dec. 31, 1964, Ser. No. 422,615
1 Claim. (Cl. 73—1)

This invention relates to a method for automatically calibrating direct electrical current operated measuring instruments. More specifically, it relates to a process which allows direct comparison between a test instrument and a standard instrument.

The present invention may be employed to calibrate any measuring instrument in which a variable D.C. voltage is created in response to a characteristic of the parameter being measured and in which the magnitude of the D.C. voltage is proportional to the magnitude of the characteristic being measured. Examples are thermoelectric temperature sensitive devices such as thermocouples, radiation pyrometers, and resistance thermometers or other devices such as D.C. tachometers or strain gauges. For purposes of illustration however, the present method will be discussed and illustrated for calibrating thermoelectric temperature measuring devices, and in particular, for thermocouples and pyrometers.

In the production of thermoelectric temperature measuring devices, such as thermocouples and pyrometers, one important step is the calibration of the device. The purpose of this operation is to correlate the electrical current generated by the device with a known temperature to which the device is subjected. One prior art technique used to calibrate a test thermocouple against a standard thermocouple involves placing the hot junction of the test thermocouple in a controlled, heated atmosphere. This test thermocouple is connected to a recorder which plots temperature against the electrical current generated. The standard thermocouple is not connected to a recorder, but is used merely to indicate the temperature of the controlled atmosphere at the hot junction of the test thermocouple. The environment at the hot junction is heated until the standard thermocouple indicates a certain temperature. At this moment, the electrical current in the test thermocouple is then recorded at the known temperature, as indicated by the standard thermocouple. One point on the test thermocouple now having been calibrated, the temperature of the controlled environment is then increased to a second temperature, as indicated by the standard thermocouple. Once the controlled atmosphere has stabilized at this new temperature, a second recording can be made of the test thermocouple. This process is continued for as many calibration points as are desired for the test thermocouple.

This prior art method, however, is undesirable since it is time consuming and therefore expensive. The principle objection is the slow response of the thermal system, which provides the controlled atmosphere, and the time required to make absolutely certain that the temperature being measured is the desired temperature. Because of this expense, the number of calibration points must be limited. Consequently, the accuracy of the thermocouple calibrated by the prior art method is limited since in using the device, much interpolating between the calibration points is required.

The same problems inherent in the prior art method for calibrating a test thermocouple through a given temperature range will also be present when it is desired to test a thermocouple at a given point over and over again. The slow response of the thermal system and the need to make absolutely certain that the temperature being measured is the desired temperature will limit the usefulness of this second type of calibration, just as it did the first. Accordingly, the cost of calibration will be more expensive since the number of calibrations that can be taken in a given space of time will be limited, and the accuracy of the resultant thermocouple will likewise be limited.

In view of the foregoing, it is an object of the present invention to eliminate the problems in the prior art calibration systems by providing a system which allows direct comparison between a test instrument and a standard instrument, and thereby eliminates the need for close control of the conditions at the sensitive element of the test instrument, and thereby allows more calibration points to be taken so that interpolation may be held to a minimum.

By the present invention, the hot junctions of the test thermocouple and the standard thermocouple are connected to each other and placed in a heated environment. The wires from both thermocouples pass through the same controlled cold junction which may be, for example, an ice bath. The wires then lead to the recording mechanism through a switch, which operates to alternately connect first the leads of one thermocouple and then the leads of the other thermocouple to the recording mechanism. When it is desired to calibrate the test thermocouple through a temperature range, the switch may be operated by a timing device. When it is desired to calibrate the test thermocouple at a given point over and over again, the switch may be made responsive to the current generated in the standard thermocouple through a relay mechanism.

Other objects of the invention will be pointed out in the following description and claim and illustrated in the accompanying drawings, which disclose, by way of example, the principle of the invention and the best mode which has been contemplated of applying that principle.

In the drawings:

FIGURE 1 is a schematic showing of one embodiment of the present invention in which a test thermocouple is calibrated through a predetermined temperature range.

FIGURE 2 is similar to FIGURE 1 but shows additional equipment which may be employed in the recorder circuit.

FIGURE 3 is a schematic illustration of another embodiment of the invention in which the test thermocouple is repeatedly calibrated at the same predetermined temperature.

FIGURES 4 and 5 are partial schematic illustrations showing modifications of the embodiments of the invention shown in FIGURES 1 through 3.

FIGURES 1 and 2 show schematically an arrangement of the instant invention which is adapted particularly for calibrating a thermoelectric temperature measuring device through a predetermined temperature range.

Referring to FIGURE 1, a test thermocouple 10 is shown with its hot junction in the controlled heated environment 14 and its cold junction in the ice bath 18. Thermocouple 12, which is the known or standard instrument, has its hot junction connected to the hot junction of the test thermocouple 10, and its cold junction in the ice bath 18 with the cold junction of the test thermocouple 10. A heat source 16 provides the temperature increase in the controlled heated environment 14.

From the ice bath 18 the leads from the thermocouples 10 and 12 extend into a switching mechanism 20, which will be described in more detail hereinafter. Leads 22 carry the thermocouple current from the switching mechanism to a recording mechanism 24. The recorder 24 has a single recording pen which records the electrical current for both thermocouple 10 and thermocouple 12 on a single recording graph, the switching mechanism 20 determining which thermocouple is connected to the recorder at any given moment.

The switching apparatus 20 may be a known switch which includes blades 38 for selectively connecting either thermocouple 10 or thermocouple 12 to leads 22. The movement of the blades 38 is determined by a switch actuating mechanism 26. This mechanism may be, for example, either a selenoid or a pneumatic cylinder. The switch actuating member 26 is in turn operated by an adjustable timing mechanism 28.

The basic mechanism described and shown in FIGURE 1 thus provides instant comparison between the test thermocouple and the standard thermocouple, avoiding the necessity to accurately control the temperature of the heated environment 14. This result follows since the essence of the presently described method is direct comparison of the test instrument with a standard instrument rather than with a controlled atmosphere. Consequently, the exact temperature of the heat atmosphere need not be determined.

A test thermocouple which does not strictly compare with the standard instrument will produce results as shown on the graphs of recorder 24 in FIGS. 1 and 2. The optimum result would be to obtain a continuous line on the recording chart, some portions of the line provided by the test instrument and other portions by the standard instrument.

The modification shown in FIGURE 2 is similar to that shown in FIGURE 1 and like numerals are used to indicate like parts. FIGURE 2, however, shows two additional elements which may be employed in the recorder circuit to increase the accuracy of the voltage readings. First, a voltage suppressor 23 may be placed in series with both thermocouples. Next, either additionally or alternatively, an amplifier 25 may be placed into the circuit. These additional elements will enhance the accuracy and the readability of the recording apparatus.

FIGURE 3 shows another embodiment of the present invention. The basic thermocouple elements of FIGURE 3 are similar to those shown in FIGURES 1 and 2, and to that extent, like numerals are used to indicate like elements. However, the switching mechanism employed in FIGURE 3 allows the apparatus shown therein to calibrate a test instrument at a given temperature, rather than through a predetermined temperature range, and to repeat that calibration over and over again.

In this arrangement, a relay mechanism 34 is employed. Leads 32 activate a coil 42 in response to the electrical current through the circuit of the standard thermocouple 12. When the coil 42 is energized, it acts to close a switch 36 operating the switching apparatus 20 and open switch 40 which controls the heat source circuit.

In the initial position which is shown in FIGURE 3, the blades 38 within the switch apparatus 20, contact the standard thermocouple circuit 12, leading the current from thermocouple 12 into the recording mechanism. While the blades 38 are in this position, and the coil 42 is not energized, the switch 40 closes the electrical circuit controlling the heat source 16, which increases the temperature of the controlled environment 14. When the predetermined temperature is reached, the current then generated in the circuit of the standard thermocouple 12 will energize coil 42, which will in turn act to close the switch 36 which will remove the electrical power from the switch actuating mechanism 26, thereby causing the blades 38 to connect the circuit of thermocouple 10 to the recording element 24, and thereby record electrical current in thermocouple 10. The coil 42 will also, at that same instant, open switch 40 and thereby remove the heat source 16 from the controlled heated environment 14.

The operation of this embodiment is as follows. The temperature at 14 is gradually increased. A reading is then taken of the electrical current in the standard thermocouple 12. The heat source is then immediately shut off and the electrical current in the test thermocouple 10 is recorded. Thus, by recording the current in the standard thermocouple immedately before, and the current in the test thermocouple immediately after, the heat source is removed, the readings should both be made at substantially the same temperature.

With the heat source removed, the current in 12 will diminish until it reaches a point at which coil 42 will be de-energized. This will in turn open the switch 36 which will cause the blades 38 to be connected again to the circuit of thermocouple 12, and to close the switch 40 to the heat source. The heat source 16 then causes the temperature of the heated environment 14 to increase again. The cycle is then repeated. In this manner the thermocouple 10 can be calibrated at the predetermined temperature point over and over again.

FIGURES 4 and 5 show how the instant invention can be employed to calibrate thermoelectric measuring devices other than thermocouples.

FIGURE 4 shows a test pyrometer 52 and a standard pyrometer 54 which are both subjected to a heat source in the form of a black body 50, provided with heat source 51. The black body will, characteristically, absorb all of the radiation incident on its surface, and reflect, transmit or scatter none, so that the quantity and quality of the radiation that it emits is completely determined by the temperature of the body. The two pyrometers will then measure the radiation eminating from the black body, which will be a measurement of the temperature of the black body.

FIGURE 5 shows an arrangement in which two separate types of thermoelectric temperature measuring devices are used, one as the standard and one as the test instrument. The drawing shows a thermocouple 62 and a pyrometer 64. It is understood that either may serve as the standard instrument or as the test instrument. A separate voltage source 66 is employed in the thermocouple circuit to compensate for the different manner in which the thermocouple and the pyrometer respond to the temperature at the heated black body 60.

The modifications shown in FIGURES 4 and 5 can be employed with any of the embodiments of the invention shown in FIGURES 1, 2 or 3. The thermoelectric temperature measuring instruments 52, 54, 62 and 64 would be substituted for thermocouples 10 and 12 shown in FIGURES 1 through 3, while the black bodies 50 and 60 would be substituted for the controlled heat environment 14 shown in FIGURES 1 through 3.

It should be understood that the present invention may be employed both to calibrate other thermoelectric temperature measuring devices such as resistance thermometers and to calibrate other variable D.C. voltage measuring instruments such as strain gauges and D.C. tachometers.

For instruments other than temperature measuring devices the calibrating method would be similar to that described above. A test instrument and a standard instrument would be subjected to a controlled environment corresponding to the heated controlled environment 14 discussed above for the temperature measuring devices. A certain characteristic of that environment would then be varied through a predetermined range or repeatedly through a given point. The switching devices and recorder shown in FIGURES 1 through 3 would then be used to record the D.C. current generated by the test and standard instruments.

While there have been shown and described and pointed out the fundamental novel features of the invention as applied to the preferred embodiment, it will be understood that various omissions and substitutions and changes in the form and details of the device illustrated in its operation may be made by those skilled in the art without departing from the spirit of the invention. It is the intention, therefore, to be limited only as indicated by the scope of the following claim.

What is claimed is:

A method for automatically calibrating variable D.C. electrical current generating type measuring instruments such as thermocouples, pyrometers, strain gauges, D.C. tachometers and the like against a standard, the method comprising: (a) subjecting a test instrument and a standard instrument together to a controlled condition so that they are both subjected to the same parameter of that condition, (b) continuously varying the parameter the instruments are subjected to through a predetermined range, (c) alternately connecting the standard and test instruments to a recorder to alternately record the full output of each of the instruments so that they may be compared, (d) the recording and comparing step being performed at successive intervals within the predetermined parameter range.

References Cited by the Examiner

McFee Review of Scientific Instruments, vol. 23, No. 1 January 1952 pp. 52, 53.

Dauphinee, Canadian Journal of Physics, vol. 33, No. 6, June 1955, pp. 275–285.

LOUIS R. PRINCE, *Primary Examiner.*

S. C. SWISHER, *Assistant Examiner.*